Dec. 15, 1970  R. K. LEE ET AL  3,547,520
STEREOSCOPE
Filed Dec. 13, 1967  2 Sheets-Sheet 1
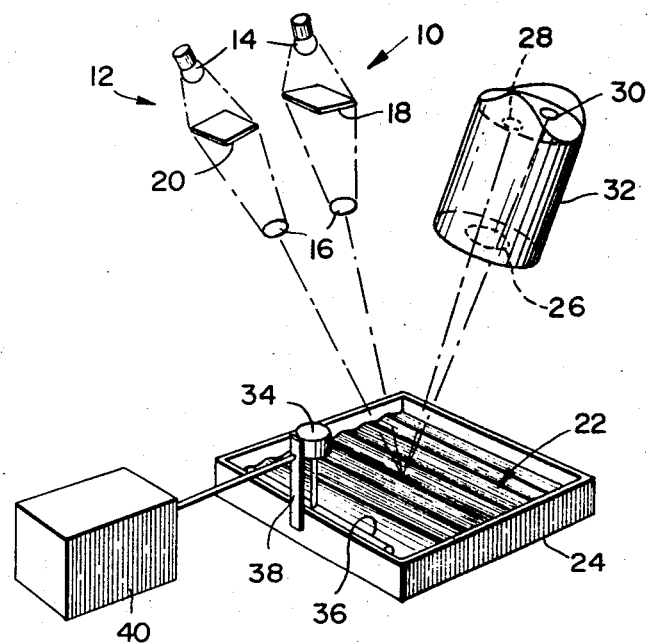
FIG. 1
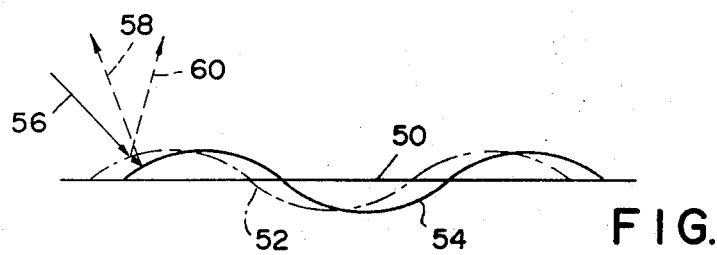
FIG. 2
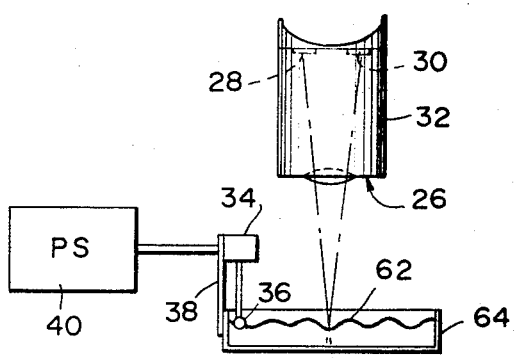
FIG. 3
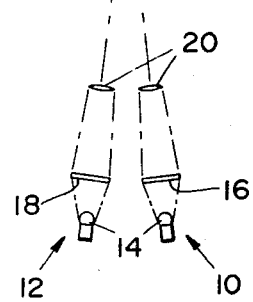
*INVENTORS*
ROGER K. LEE
RICHARD W. DYER Dec. 15, 1970   R. K. LEE ET AL   3,547,520
STEREOSCOPE
Filed Dec. 13, 1967   2 Sheets-Sheet 2
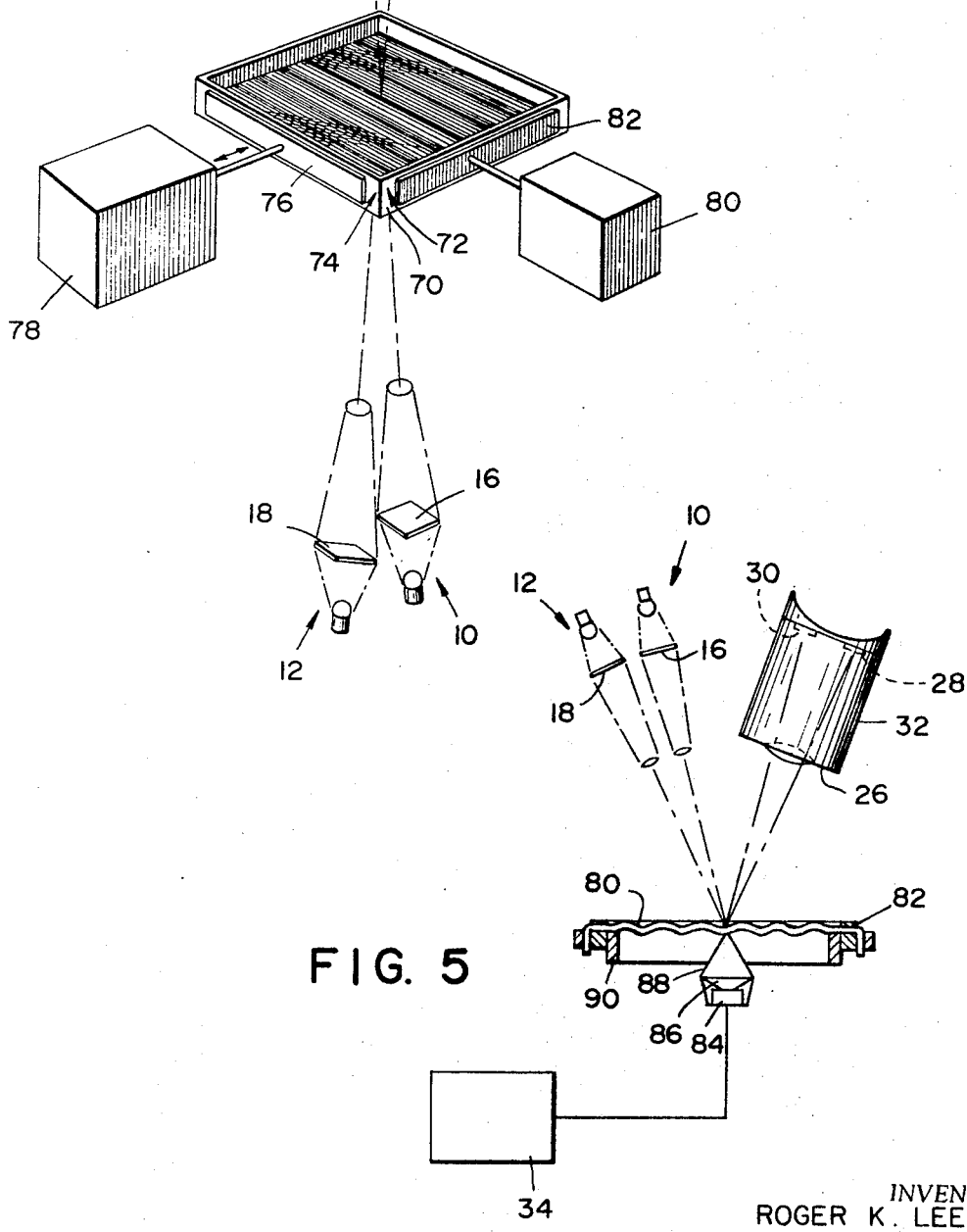
INVENTORS
ROGER K. LEE
RICHARD W. DYER 3,547,520
STEREOSCOPE
Roger K. Lee, Watertown, and Richard W. Dyer, Acton, Mass., assignors to Itek Corporation, Lexington, Mass., a corporation of Delaware
Filed Dec. 13, 1967, Ser. No. 690,166
Int. Cl. G02b 27/22; G02f 1/28
U.S. Cl. 350—131                                             9 Claims

ABSTRACT OF THE DISCLOSURE

Apparatus for enlarging the effective exit pupil of optical apparatus and consisting of a wave-supporting medium, means for generating periodic travelling waves in the medium, means for projecting light rays corresponding to an image on the medium, and viewing means disposed to receive the light rays, the light rays being transmitted to the viewing means from the wave-supporting medium at varying angles in accordance with the vibrations established in the medium to thereby enlarge the effective exit pupil of the viewing means.

BACKGROUND OF THE INVENTION

Field of the invention

The invention relates to stereoscopy and more particularly to an improved stereoscopic projecting and viewing system.

Prior art

Stereoscopes are used to recreate or simulate a three-dimentional view of an object by combining two or more two-dimensional views of it ("left" and "right" stereoscopic images) taken from slightly displaced positions to provide the necessary binocular effect in the reconstructed, composite image. It is generally desired that the reconstruction system provide clarity of detail and ease of viewing. Further, it is also desirable that the viewing system have a relatively large exit pupil so that the observer's eyes are not restricted to viewing the reconstruction from an uncomfortably limited vantage point.

At present, there are three main types of stereoscopic systems utilized to reconstruct the stereo image. These systems may be classified as (1) polarizer reconstruction, (2) color reconstruction and (3) geometric reconstruction. In each of the first two types, diffusion screens are used to overcome the limited exit pupil, other means being used to separate the disparate stereo images. In the third, the exit pupil limitation is the prime disadvantage.

In a polarizer reconstruction system, the object whose three-dimensional image is to be formed is photographed by a camera to form "left" and "right" images of the object corresponding to the images of the object seen by a viewer's eyes. In reconstructing the three-dimensional image, the respective two-dimensional images are each illuminated with polarized light whose polarization axes are mutually orthogonal to each other. The images are viewed through separate polarizing filters, each of which has a unique direction of polarization corresponding to the polarization of the light by which the original image was illuminated. This alignment must be maintained throughout the viewing process to prevent undesired "cross-talk" in the form of simultaneous viewing of the two images by both eyes. Normally, the images are projected in superposition on to a viewing screen to provide a large field of view to the observer. However, a large amount of definition is lost due to the presence of polarizing particles in the filters, and to the granularity of the usual screen. Furthermore, the viewing screen greatly reduces the brightness of the image.

A second kind of stereoscopic reconstruction system utilizes specially-prepared color-sensitive films which are selectively exposed through different color filters to form the "left" and "right" images (so-called "color anaglyphs") of the three-dimensional object. These images are then recombined with the aid of additional color filters. Such a system causes eye strain during prolonged viewing; it also prevents reproduction of stereoscopic images in color. As in the polarizer reconstruction, viewing screens are often employed, reducing image definition and brilliance.

The third type of system, using geometric reconstruction, produces a three-dimensional image of an object by separately projecting the "left" and "right" images of the object through symmetrical systems of lenses and mirrors for viewing separately by the respective eyes. Systems of this type generally have a high level of image definition and brilliance but have limited application because their limited exit pupil makes prolonged viewing very tiring.

SUMMARY OF THE INVENTION

In accordance with the invention, a pair of left and right ("stereoscopic") diapositives (prints for projection) are projected in overlapping relation onto a wave-supporting medium such as a liquid or a thin membrane in order to reflect (or refract) the images into the eye piece of a stereoscopic viewer. It is understood that a single, large diameter eye piece can be used to project the separate, disparate (stereoscopic) images to the observer, or a pair of separate eye pieces may be used. Travelling mechanical waves are established in the medium by one or more transducers to alter the angle at which the images are reflected (or refracted) in a controlled manner so that the travelling waves cause the light from the images to sweep across the instrument exit pupil plane which must coincide with the pupil of the eye of the viewer. The position of the instrument's exit pupil is defined by the focus of the principal rays through the eye piece. Since the travelling waves are precisely located in the image plane, the angle of the principal rays is deviated without affecting the stability of the focused image. This greatly expands the effective exit pupil of the stereoscopic system by rapidly averaging the instantaneous pupil over any desired area and additionally provides a relatively high resolution and brilliance as contrasted with conventional projection systems using a screen. Conversely, a higher magnification for a given size exit pupil can be used.

The waves established in the wave-supporting medium may be either transverse (in which the particles of the medium vibrate in a direction transverse to the direction of travel of the wave) or longitudinal (in which the particles of the medium vibrate in a direction parallel to the direction of travel of the wave) and may be either one-dimensional (travelling in one direction only) or two-dimensional (having velocity components in each of two mutually perpendicular directions). The one-dimensional waves sweep the light from the diapositive images across the pupils of the eye of the viewer in one direction only, while the two-dimensional waves sweep the diapositive images across the eye pupils of the viewer in two directions and thereby provide an even larger effective exit pupil then provided by the one-dimensional scanning system. The images may be projected toward the viewer either by reflection from the surface of the wave-supporting medium, or by refraction through the medium.

In one embodiment of the invention, the wave-supporting medium is a liquid such as water or mercury and reflection from one-dimensional, transverse travelling waves established in the liquid is used to project the image into the eye pieces. This system is simple and easy to set up and provides the desired increased exit pupil.

In another embodiment of the invention, the liquid is enclosed in a transparent tank. The stereoscopic images are projected through the tank and into the liquid where they are refracted at the surface by transverse travelling waves established in it. This method of projection increases the illumination efficiency of the system and improves its optical quality.

In still another embodiment of the invention, the wave-supporting medium is again a transparent liquid such as water and the images are projected into the stereoscopic viewer by means of the diffraction effect caused by longitudinal travelling maves (compressional waves) established in the medium by a suitable transducer. The change in index of refraction of the fluid caused by the travelling pressure waves varies the angle at which the incident light rays are refracted from the medium and thus causes effective scanning of the exit pupils of the viewing system. Again, this system provides a nearly normal optical viewing axis and is optically highly efficient.

The wave-supporting medium may also be a non-fluid material. For example, it may take the form of a membrane having an aluminized reflecting surface. The membrane is supported in a suitable structure which maintains it in a taut condition. Two-dimensional, transverse travelling waves are established in the membrane by means of an acoustical transducer positioned at its center. This system provides inherent two-dimensional scanning and has the advantage of being optically efficient and relatively inexpensive to construct.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 1 is a diagrammatic view, in perspective, of a stereoscopic projection and viewing system utilizing reflection from a liquid surface in which transverse travelling waves are established;

FIG. 2 is a diagram of a portion of the reflecting surface of FIG. 1 enlarged to show the varying directions of reflection at different times;

FIG. 3 is a diagrammatic view, in side elevation of an alternative embodiment of a stereoscopic projection and viewing system in which the stereoscopic images are transmitted to the viewer by refraction through a liquid medium supporting transverse travelling waves;

FIG. 4 is a diagrammatic view, in perspective, of another embodiment of a stereoscopic projection and viewing system utilizing refraction through a liquid medium supporting longitudinal (compressional) waves; and FIG. 5 is a diagrammatic view, in side elevation, of still another embodiment of a stereoscopic projection and viewing system in which the images are transmitted by reflection from a thin membrane supporting transverse-travelling waves.

SPECIFIC DESCRIPTION OF THE INVENTION

In FIG. 1, we have shown a stereoscopic projection and viewing system having stereoscopic projectors 10 and 12 comprising light sources 14 and projecting lenses 16 for projecting diapositive images 18 and 20 onto the surface of a liquid 22 in a container 24. The images projected onto the liquid are reflected from its surface and imaged through a single, large eye piece lens 26 into eye positions 28 and 30 which coincide with the exit pupils of the projection and viewing system and with the planes of the eyes of the observer when the observer's face is placed against a viewer 32. For purposes of illustration, the eye positions may be considered to be formed as cutouts in a mask 31. The dimensions of the exit pupils are determined by the optics of the system; when the liquid 22 is at rest, the dimensions of these pupils may be relatively small (e.g. ⅛" in diameter).

Transverse travelling waves are established in the liquid 22 by a transducer 34 which imparts a vertical driving motion to an elongated member 36 in contact with the liquid. The transducer is supported on the container 24 by a brace 38 and is supplied with driving signals from a power supply 40. The member 36 is thus periodically reciprocated by the transducer 34 to establish transverse travelling waves on the surface of the liquid 22 which propagate across it.

As the waves travel across the surface of the liquid, the angle which an incident ray makes with the normal to the surface (the angle of incidence) changes in periodic fashion in accordance with the periodically varying undulations of the surface of the liquid in the area of incidence. Accordingly, the angle of reflection also changes in periodic fashion and the reflected ray sweeps across the eye positions 28 and 30, thereby effectively increasing the dimensions of the exit pupils and thus the freedom of head position of the observer. For example, in a case where the exit pupils of the eye pieces were approximately ⅜" wide prior to sweeping the eye pieces with the diapositive images, the effective dimensions of the exit pupils were increased to 1½" wide by sweeping the eye positions as described above. This results in increased viewing ease since the expanded pupil size insures that slight shifts in the position of an observer's eyes can be accommodated by the system without obscuring the projected images. The expanded exit pupil also allows the use of a wider variety of eye bases to accommodate a greater variety of uses without the use of the usual mechanical adjustments.

FIG. 2 is an enlarged view, in side section, of the liquid surface of FIG. 1 illustrating the reflection process in more detail and showing a travelling wave at two different moments of time. The initially undisturbed, level surface 50 of the liquid successively assumes shapes 52 and 54 corresponding to the shape of the travelling wave at two different times as it moves across the liquid. An incident principal ray 56 from the stereoscopic projecter is thus reflected in a direction 58 by the wave at a first instant of time and is subsequently reflected in a direction 60 by the wave at a later instant.

As may be seen from the drawing, the rays 58 and 60 are reflected in quite different directions dependent on the amplitude and shape of the wave at the point of incidence of the ray at a given time. The maximum angular divergence between the reflected rays is thus dependent on the harmonic composition of the travelling waves propagated through the fluid; by controlling the driving waveform and frequency, the enlargement of the exit pupil, and the frequency at which it is swept, may be varied at will by the operator of the system.

Since standing waves will interfere with the formation of clear images in the eye pieces, the driving frequency, together with the length of the tank, should be chosen so as to avoid any resonance condition which would generate such waves. The driving frequency should also be sufficiently high so that the movement of the waves across the projected images is not detectable. Generally, a driving frequency corresponding to a wave velocity in excess of a few feet per second is a satisfactory lower frequency limit.

The system described in FIG. 1 may, with slight modification, be utilized to provide a projection system utilizing refraction instead of reflection. Referring to FIG. 3, the stereoscopic projectors 10 and 12 project the images of diapositives 16 and 18 through lenses 20 onto the surface of a transparent liquid 62 through the bottom of a transparent container 64. The images are refracted at the surface of the liquid 62 into the viewing lens 26 and thence into the eye positions 28 and 30 of the stereoscopic viewer 32. As was the case with the apparatus of FIG. 1, the liquid surface 62 is agitated in a vertical direction by a transducer 34 which drives an elongated member 36 in vertical reciprocating motion to establish travelling waves on the surface of the liquid.

Light rays from the stereoscopic projectors in FIG. 3 enter the container 64 from the bottom at nearly right angles to the container, the deviation from the normal generally being dependent only on the stereoscopic angle between the projectors. These rays are bent slightly toward the normal on entering the liquid, since the liquid is assumed to have a higher index of refraction than the surrounding environment (air). On striking the upper surface of the liquid, the rays are again bent away from the normal to the surface. Since the "shape" of the surface is continually changing with time in accordance with the transverse waves propagated across it, the position of the normal to the upper surface varies with time. Accordingly, the light rays incident from below upon a given portion of the upper surface are refracted at varying angles to its undisturbed position and therefore sweep back and forth across the eye positions 28 and 30 in the viewer 32 to increase the effective dimensions of the exit pupils.

The illumination efficiency and optical quality of the projected images is relatively high for the apparatus shown in FIG 3 as contrasted to that shown in FIG. 1 since a higher portion of the transmitted light is supplied to the eye pieces in the latter system. This system is therefore advantageous when the light output of the projectors must be conserved.

So far, the invention has been described in connection with the transverse travelling waves established in a liquid medium. It is well known that a liquid may also support longitudinal (compressional) travelling waves as well as transverse waves. The longitudinal waves may also be utilized to increase the effective dimensions of the exit pupils of the stereoscopic viewer as will now be described in more detail.

FIG. 4 illustrates a projection and viewing system using longitudinal (compressional) travelling waves in a liquid medium to sweep light rays across an observer's eyes. Stereoscopic projectors 10 and 12 of the type previously described transmit the diapositive images 16 and 18 through the transparent bottom of a container 70 filled with a transparent liquid 72 such as water or the like. These light rays which form the images undergo variable refraction due to the compressional variation of the index of the medium; they are deflected as they transverse the liquid and are swept across the eyepiece lens 26 of the stereoscopic viewer 32 across the plane of the exit pupils 28 and 30.

The container 70 has a flexible end wall 74 on which a transducer 76 is mounted for reciprocating motion in a direction perpendicular to the plane of the wall 74. The transducer 76 is driven from a power supply 78. A power supply 80 is used to drive a transducer 82 similar to the transducer 76 and attached to one of the side walls for establishing compressional waves in a direction perpendicular to the direction of the waves established by the transducer 76.

The operation of the projection and viewing apparatus of FIG. 4 is as follows: assuming for the moment that one-dimensional waves are to be propagated through the liquid 72, the transducer 76 is energized from the source 78 to establish compressional waves in the liquid. The "crests" and "troughs" of these waves are regions of different density and therefore different index of refraction. They are indicated in the drawings by the regions of heavy-density lines and light-density lines respectively. The angle that a refracted ray leaving the liquid makes with the normal to the plane of the liquid surface at a given time is dependent on the refractive index of the liquid at that portion of the surface at the time in question. Since the waves travel through the liquid, the refractive index at each point varies with time and, accordingly, the angle at which a particular light ray is refracted, also varies in time-dependent fashion. Thus, the images transmitted to the eye positions 28 and 30 from the projectors 10 and 12 are formed by light rays which effectively sweep across these areas at a rate dependent on the amplitude and frequency of the compressional motion imparted to the liquid by the transducers. This increases the effective dimensions of the exit pupils as described previously. As was the case with the apparatus of FIGS. 1 and 3, the exit pupil may effectively be enlarged to an even greater extent by energizing additional transducers, such as the transducer 82 of FIG. 4, to provide a two-dimensional sweep of the eye positions.

In FIG. 5 we have depicted a side sectional view of a projection and viewing system which utilizes a thin reflecting membrane to enlarge the exit pupils of the eye pieces by providing two-dimensional travelling waves to sweep the light rays to the eye pieces. The stereoscopic viewers 10 and 12 project diapositive images 16 and 18 onto the surface of a thin membrane 80 which is treated to provide a good reflecting surface for light incident on it. For example, the membrane 80 may have an aluminized surface to provide the desired reflectivity. The images are reflected from this membrane and transmitted through the lens 26 of the stereoscopic viewer 32 into the left and right eye positions 28 and 30 respectively.

The membrane 80, which may advantageously be circular in shape, is supported in a frame 82 in taut condition. An acoustic transducer 84 having a diaphragm 86 is positioned inside a focusing cone 88 which concentrates the sound waves generated by the transducer and applies them to the central region of the membrane 80. A central damping ring 90 positioned against the underside of the membrane 80 and slightly inside the frame 82 prevents reflections from the frame which might establish standing waves in the membrane.

When the transducer is energized from the source 34, it generates acoustic signals of predetermined amplitude and frequency for transmission to the central portion of the membrane 80 via the focusing cone 88. These signals impinge upon the membrane 80 and generate a series of travelling, mechanical waves in it which spread out from the center of the membrane. When the images of the diapositives 16 and 18 are projected and focused onto the membrane surface, therefore, they are reflected at varying angles into the lens 26, the angle of reflection being dependent upon the position of the membrane surface at the point of incidence and at the moment of incidence. Since the position of each point in the membrane surface is deflected by an amount which depends on the amplitude and frequency of the signals applied to it, the light reflected from the travelling wave surface periodically sweeps back and forth across the eye positions 28 and 30 to enlarge the effective dimensions of the exit pupils of the system.

The stereoscopic projection and viewing device shown in FIG. 5 is characterized by a high optical efficiency and is especially advantageous in that it employs relatively inexpensive components and yet offers a ruggedness and portability which are not limited by the use of a liquid reflecting or refracting surface. Further, it inherently provides a two-dimensional enlargement of the exit pupils with only a single transducer. It will be noted that the transducer 84 need not be an acoustic transducer (although such is preferred); for example, it may be replaced by an electromagnetic or piezoelectric actuator mechanically coupled to the membrane 80.

Various modifications may be made in the above embodiments without departing from the scope and spirit of our invention. Thus, for example, two-dimensional scanning may also be provided in the apparatus shown in FIGS. 1 and 3 by adding one or more additional transducers which will propagate waves in a direction at right angles to the direction in which they are propagated by the transducers shown. Further, since pressure waves, both longitudinal and transverse, may be established in solid, elastic material, such materials may be utilized in place of the media shown in the drawings to provide the desired scanning action for stereoscopic images reflected from it or refracted by it. For example, longitudinal compressional waves and transverse shear waves may be established in a transparent plastic block by suitable transducers and the resultant change in the reflection or refraction characteristics of the block used to vary the angles of the transmitted rays of the stereoscopic images. As used herein, the term "solid" should also be understood to include semi-solids such as gels which also may be used to periodically vary the transmission characteristics of the system in the desired manner.

It will also be noted that the apparatus of the invention may readily be applied to non-stereoscopic optical systems to increase their effective exit pupil in the manner described herein.

It will thus be clear that we have provided improved stereoscopic projection and viewing systems which make use of travelling waves established in a wave-supporting medium to transmit stereoscopic images to a viewing station. The systems illustrated and described provide high resolution and high brilliance. The medium utilized may be a fluid, an elastic solid, or a thin membrane. The travelling waves may be of either the transverse or the longitudinal (compressional) type, these waves existing in either one- or two-dimensions to cause a corresponding sweeping of the eye positions of the viewer and thereby effectively enlarge the exit pupils of the system.

It will thus be seen that the objects set forth above, among those made apparent from the preceding description, are efficiently attained and, since certain changes may be made in the above constructions without departing from the scope of the invention, it is intended that all matter contained in the above description shall be interpreted as illustrative and not in a limiting sense.

We claim:
1. Apparatus for obtaining a stereo view from left and right stereo images, which produce a stereo effect due to parallax between the left and right images, comprising:
   (a) a left viewer having a left viewing area;
   (b) a right viewer having a right viewing area;
   (c) means to project the left image principally onto said left viewing area;
   (d) means to project the right image principally onto said right viewing area;
   (e) transmission means, optically aligned with at least one of said viewers, to effectively increase the viewing area of said at least one of said viewers by transmitting its projected image in a sweeping motion periodically across the viewer, whereby said apparatus has an effectively expanded viewing area.
2. Apparatus as set forth in claim 1 wherein each of said projected images is periodically swept across its corresponding viewer.
3. Apparatus as set forth in claim 1 wherein said transmission means includes:
   (a) a wave-supporting medium;
   (b) means for generating periodic waves in said medium; and
   (c) means for projecting at least one of the images onto said wave-supporting medium for transmission to its corresponding viewer.
4. Apparatus as set forth in claim 3 wherein said means for generating periodic waves generates longitudinal waves in said wave-supporting medium.
5. Apparatus as set forth in claim 3 wherein said means for generating periodic waves generates transverse waves in said wave-supporting medium.
6. Apparatus as set forth in claim 3 wherein said wave-supporting medium transmits said at least one image to its corresponding viewing area by refraction through said wave-supporting medium.
7. Apparatus as set forth in claim 3 wherein said wave-supporting medium transmits at least one image to its corresponding viewer by reflection from said wave-supporting medium.
8. Apparatus as set forth in claim 7 wherein said wave-supporting medium is a thin reflective membrane and said means for generating periodic waves in said medium is an electro-mechanical transducer.
9. Apparatus as set forth in claim 8 wherein each of said projected images is periodically swept across its corresponding viewer.

References Cited
UNITED STATES PATENTS

| | | | |
|---|---|---|---|
| 2,036,554 | 4/1936 | Thomas | 350—161X |
| 2,605,352 | 7/1952 | Fischer | 350—161X |
| 2,879,337 | 3/1959 | Reis | 350—161 |
| 3,158,430 | 11/1964 | McNaney | 350—161 |
| 3,317,206 | 5/1967 | Holt | 350—144X |
| 3,337,287 | 8/1967 | Lessman | 350—179X |
| 2,361,390 | 10/1944 | Ferrill | 350—144 |

FOREIGN PATENTS

| | | | |
|---|---|---|---|
| 505,180 | 7/1920 | France | 350—144 |
| 1,160,172 | 10/1956 | France | 350—144 |

OTHER REFERENCES

Electronics Review, T.K. 7800, vol. 39, No. 3, E58, Feb. 7, 1966, pp. 41–42.

PAUL R. GILLIAM, Primary Examiner

U.S. Cl. X.R.

350—144, 161